(12) United States Patent
Samukawa

(10) Patent No.: US 6,800,017 B2
(45) Date of Patent: Oct. 5, 2004

(54) APPARATUS FOR PROCESSING A LENS

(75) Inventor: Masahiko Samukawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/406,606

(22) Filed: Apr. 4, 2003

(65) Prior Publication Data
US 2003/0214627 A1 Nov. 20, 2003

(30) Foreign Application Priority Data
Apr. 8, 2002 (JP) ........................................ 2002-105566

(51) Int. Cl.[7] ............................................ B24B 49/00
(52) U.S. Cl. ................... 451/5; 451/8; 451/41; 451/42; 451/43; 451/44; 451/60; 451/87; 451/88; 451/255; 451/256; 451/446; 451/451
(58) Field of Search ............................ 451/5, 8, 41, 42, 451/43, 44, 60, 87, 88, 255, 256, 446, 481

(56) References Cited

U.S. PATENT DOCUMENTS

| 4,766,699 | A | 8/1988 | Gottschald et al. | |
|---|---|---|---|---|
| 6,572,460 | B2 * | 6/2003 | Mizuno | 451/178 |
| 6,672,948 | B2 * | 1/2004 | Mizuno | 451/60 |
| 2001/0053659 | A1 | 12/2001 | Shibata | |

FOREIGN PATENT DOCUMENTS

| GB | 2151956 A | 7/1985 |
|---|---|---|
| JP | 9-225799 | 9/1997 |
| WO | WO 01/03883 A1 | 1/2001 |

OTHER PUBLICATIONS

T. Schultz, European Search Report, European Patent Application No. EP 03 00 7807, The Hague, Sep. 30, 2003, 3 pages.

* cited by examiner

Primary Examiner—Joseph J. Hail, III
Assistant Examiner—Shantese McDonald
(74) Attorney, Agent, or Firm—Griffin & Szipl, P.C.

(57) ABSTRACT

A lens-holding shaft 41 displaces a lens 1 towards a main rotating tool 50 for processing the peripheral portion of the lens 1. A long hole 115 penetrating a waterproof case 101 is formed in the waterproof case 101 along the locus of displacement of the lens-holding shaft 41 and the lens-holding shaft is inserted through the long hole 115. At the outside of the waterproof case 101 along the long hole 115, a flexible water-resistant sliding shutter 130 is disposed in a manner such that the sliding shutter 130 can be freely displaced. The sliding shutter 130 is connected with the lens-holding shaft 41. A guide member 150 containing the sliding shutter 130 is bent at a position before the main shaft 51.

11 Claims, 14 Drawing Sheets

APPARATUS FOR PROCESSING A LENS

FIELD OF THE INVENTION

The present invention relates to an apparatus for processing a lens, particularly for processing the peripheral portion of a lens such as a spectacle lens to provide a prescribed shape so that the lens can be fitted into a spectacle frame.

BACKGROUND OF THE INVENTION

Heretofore, when a lens such as a spectacle lens is processed so that the lens is fitted into a spectacle frame, the peripheral face of an uncut lens is ground by a grinder or cut by a cutter and the uncut lens is formed into a prescribed shape having a peripheral portion in accordance with data of the shape the spectacle frame.

Examples of known processing apparatuses for this purpose include, as disclosed in Japanese Patent Application Laid-Open No. Heisei 9(1997)-225799. In such apparatuses the peripheral portion of a lens is processed to a prescribed shape by swinging a lens-holding unit holding the lens relative to a rotating tool (a grinder) for grinding the peripheral face of the lens. The rotating tool and the lens-holding shaft are covered with a waterproof cover so that cooling water injected towards the lens and the tool is not scattered to other portions of the inside of the apparatus.

In this type of the waterproof mechanism, the waterproof cover has a small size so that the size of the portion for injecting the cooling water can be decreased. When the apparatus has a structure in which the lens-holding unit is swung relative to the rotating tool, the waterproof cover and a tank for storing the cooling water are fixed in the apparatus. An opening is formed in the waterproof cover along the locus of the swinging, lens-holding shaft and the lens-holding shaft is inserted through the opening.

A sliding shutter swinging in combination with the lens-holding shaft is disposed at the opening, so that scattering of the cooling water on the outside is prevented.

The conventional technology described above has the following problems. Since the shaft of the rotating tool is deviated from the extension of the locus of the lens-holding shaft, a sliding shutter swinging in combination with the lens-holding shaft does not interfere with the shaft of the rotating tool when the sliding shutter comes close to the rotating tool. However, when the shaft of the rotating tool is placed on the extension of the direction of displacement of the lens-holding shaft, the sliding shutter interferes with the shaft of the rotating tool when the lens-holding shaft comes close to the rotating tool and the device cannot be made waterproof. This phenomenon restricts the freedom of design markedly.

The present invention has been made to overcome the above problems and has an object of providing a mechanism which can surely prevent scattering of the cooling water even when the shaft of the rotating tool is disposed on an extension of the locus of displacement of the lens-holding shaft.

SUMMARY OF THE INVENTION

The present invention provides an apparatus for processing a lens which comprises in a waterproof case a lens-holding shaft which holds a lens and a means for processing which processes the lens and processes a peripheral portion of the lens while the lens-holding shaft is displaced towards the means for processing and a cooling liquid is injected towards the lens; wherein a long hole is formed along a locus of displacement of the lens-holding shaft at a portion of the waterproof case where the lens-holding shaft penetrates the waterproof case; a sliding shutter which closes the long hole and is freely flexible is connected to the lens-holding shaft; and a guide member which guides the sliding shutter is bent in an axial direction of the lens-holding shaft at an outside of the long hole. The direction of the displacement of the sliding shutter is thus changed and interference with the mechanisms and members in the apparatus for processing a lens is prevented.

In accordance with the present invention, when the range of displacement of the lens-holding shaft is made waterproof by the sliding shutter, the long hole corresponding to the locus of displacement of the lens-holding shaft can be surely made waterproof while the interference of the end portion of the sliding shutter with other members and mechanisms is prevented. The freedom of the arrangement of various mechanisms constituting the apparatus for processing a lens can be remarkably increased and the apparatus for processing a lens which is excellently waterproof can be provided. In particular, this apparatus is effective when the mechanisms for cooling and waterproofing are arranged after the arrangements of various mechanisms have been decided. The guide members of the sliding shutters can be arranged utilizing a space such as a space at the side of the waterproof case and the freedom of the design can be increased.

In accordance with yet another embodiment, there is provided an apparatus for processing a lens. The apparatus comprises a waterproof case, and a lens-holding shaft arranged to hold a lens and penetrate the waterproof case, and disposed at least partially in the waterproof case. A processing device is provided disposed to processes a peripheral portion of the lens, wherein the lens-holding shaft is displacable towards the processing device. A cooling liquid dispenser is provided disposed to inject cooling liquid towards the lens. A long hole is formed along a locus of displacement of the lens-holding shaft at a portion of the waterproof case where the lens-holding shaft penetrates the waterproof case. A flexible sliding shutter is connected to the lens-holding shaft and disposed to close the long hole. A guide member is disposed outside of the long hole to guide the sliding shutter, wherein the guide member is bent in an axial direction of the lens-holding shaft.

In accordance with a yet further embodiment, the processing device comprises a main shaft parallel with the lens-holding shaft, and the guide member is bent at a position between the long hole and the main shaft.

In accordance with another embodiment, the apparatus further comprises a drain arranged to discharge cooling liquid accumulated at a lower portion, or at an inside of the guide member.

In accordance with another embodiment, the waterproof case stands in a vertical direction, the lens-holding shaft is displaced in a vertical direction above the main shaft, and the guide member is disposed in a vertical direction at a position facing the long hole and is bent above the main shaft towards an outside of the apparatus.

In accordance with a still further embodiment, there is provided an apparatus for processing a lens, comprising a waterproof case and a lens-holding shaft arranged to hold a lens. A finishing device is provided disposed to chamfer or groove a peripheral portion of the lens. A measurement device is provided disposed to measure a peripheral shape of the lens, and process a peripheral portion of the lens, wherein the lens-holding shaft is displacable toward the finishing device. A cooling liquid dispenser is provided disposed to inject cooling liquid towards the lens. The lens-holding shaft is elevatable and lowerable in a vertical direction. The measurement device is fixed on an upper face of the waterproof case and supports a pair of measuring devices protruding towards an inside of the waterproof case in a manner such that the measuring device is displaceable along the lens-holding shaft. The finishing device is disposed on the upper face of the waterproof case and supports rotating tools for processing a peripheral portion of the lens, wherein the rotating tools are displacable between a position vertically above the holding shaft and a prescribed waiting position in a direction intersecting the holding shaft. A first penetrating hole having a shape of a long hole is formed on the upper face of the waterproof case in accordance with a range of displacement of the measuring device along the holding shaft. A second penetrating hole is formed on the upper face of the waterproof case in accordance with a range of displacement of the rotating tools in a direction intersecting the holding shaft. One or more shutters are disposed at a side of the rotating tool, and arranged to close the first penetrating hole and the second penetrating holes at an inner periphery of the waterproof case.

In a still further embodiment, the finishing device further comprises a base disposed on an upper face of the waterproof case and displaced towards the holding shaft, one or more sleeves fixed at the base and protruding into an inside of the waterproof case, and rotating tools disposed at lower ends of the sleeves. The shutters further comprise a first shutter disposed at the sleeves towards the first penetrating hole in a horizontal direction along the inside of the waterproof case and a second shutter disposed at the sleeves at a side opposite to a side of the first penetrating hole.

In yet another embodiment, the apparatus further comprises concave portions engagable with portions of the sleeves and formed at a position intersecting the second penetrating holes in the first penetrating hole and penetrate the first penetrating hole, and swinging shutters arranged to selectively close the concave portions in accordance with displacement of the sleeves, and disposed at the upper face of the waterproof case.

DETAILED DESCRIPTION OF ILLUSTRATIVE EMBODIMENTS OF THE INVENTION

Figure 1:
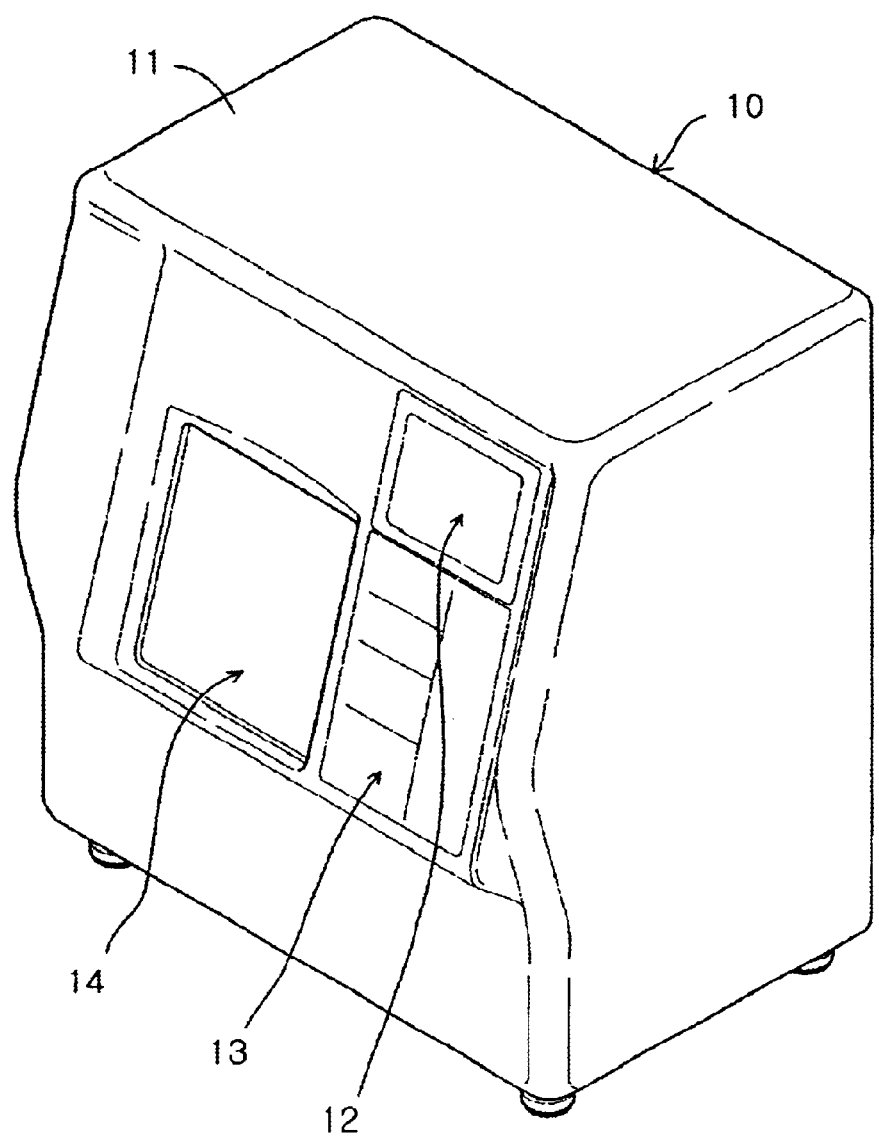
FIG. 1 shows a perspective view of the apparatus for processing a lens according to an embodiment of the present invention.

An embodiment of the present invention will be described in the following with reference to Figures, in which like parts are given like reference numerals.

Figure 3:
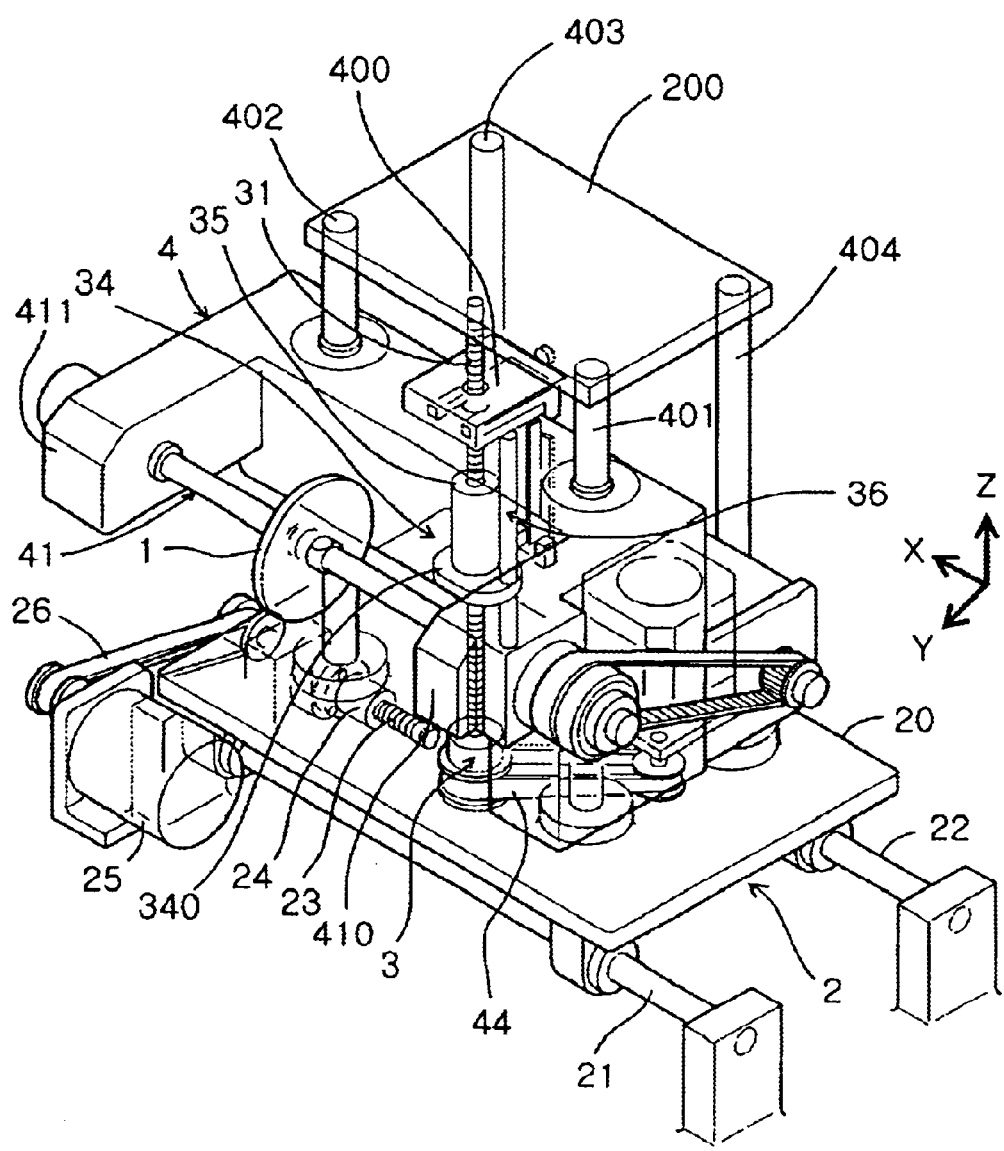
FIG. 3 shows a perspective view exhibiting a base unit, an elevating and lowering unit and a lens unit in the inner construction according to an embodiment of the present invention.
Figure 4:
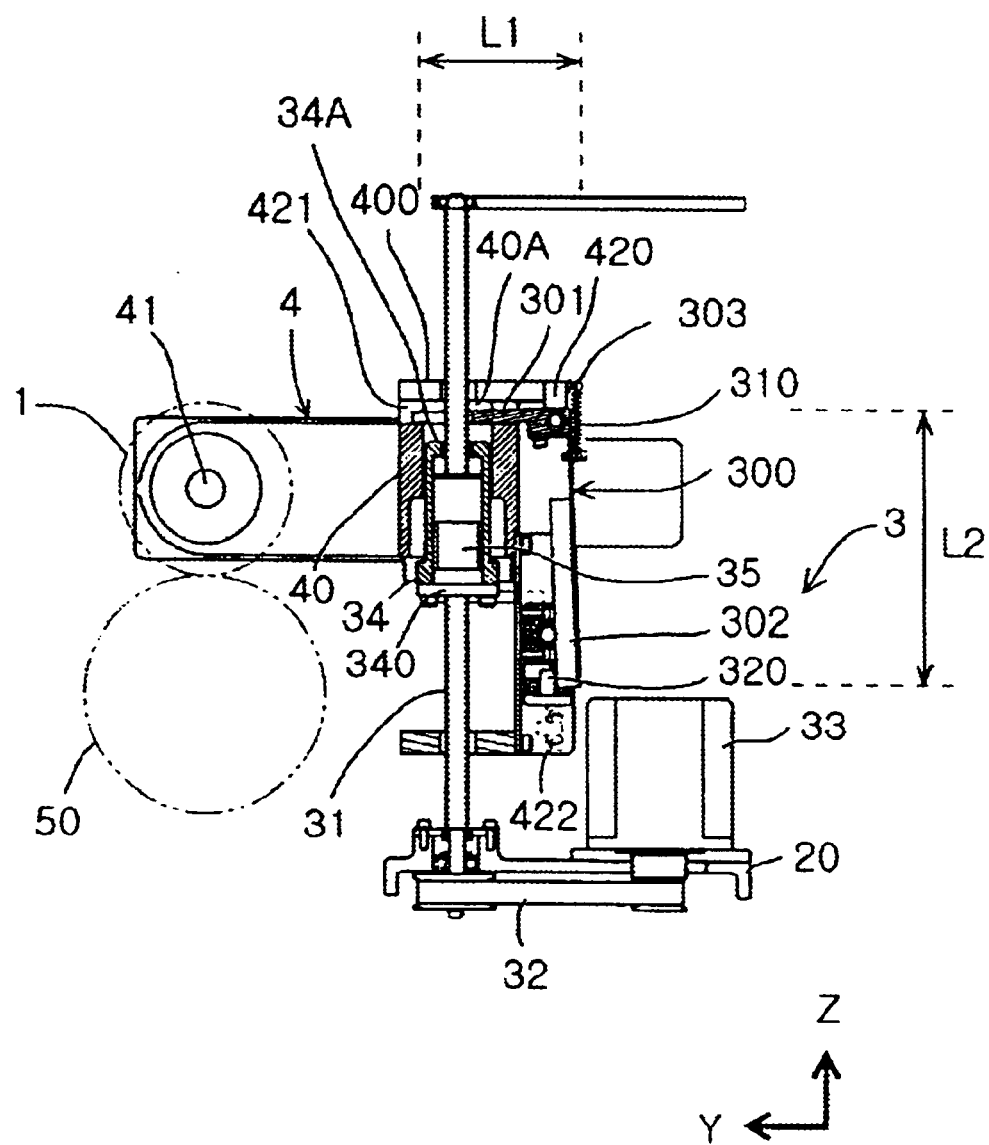
FIG. 4 shows a sectional view of the elevating and lowering unit and the lens unit in the vertical direction when the processing is started.

FIG. 1 shows a perspective view exhibiting the appearance of an apparatus 10 for processing a lens. FIGS. 3 and 4 show a front view and a right side view of apparatus 10, respectively, exhibiting the inner construction of the apparatus.

In FIG. 1, there is shown apparatus 10 for processing a lens contained in a case having the shape of a rectangular parallel piped 11. At the right front side of apparatus 10 is an operation portion 13 for selecting or inputting processing conditions for the lens, and a display portion 12 for displaying information on processing such as the data of the shape of the lens frame and other data for the processing. The operation portion 13 comprises, for example, touch panels, touch switches, keys or the like. The display portion 12 comprises an LCD, CRT or the like.

At the front center of the apparatus for 10 processing a lens, a door 14 is provided that can be opened or closed as desired and used for inserting or taking out a lens.

After the entire apparatus is described, the members and the portions will be described in detail.

Outline of the Apparatus

Figure 2:
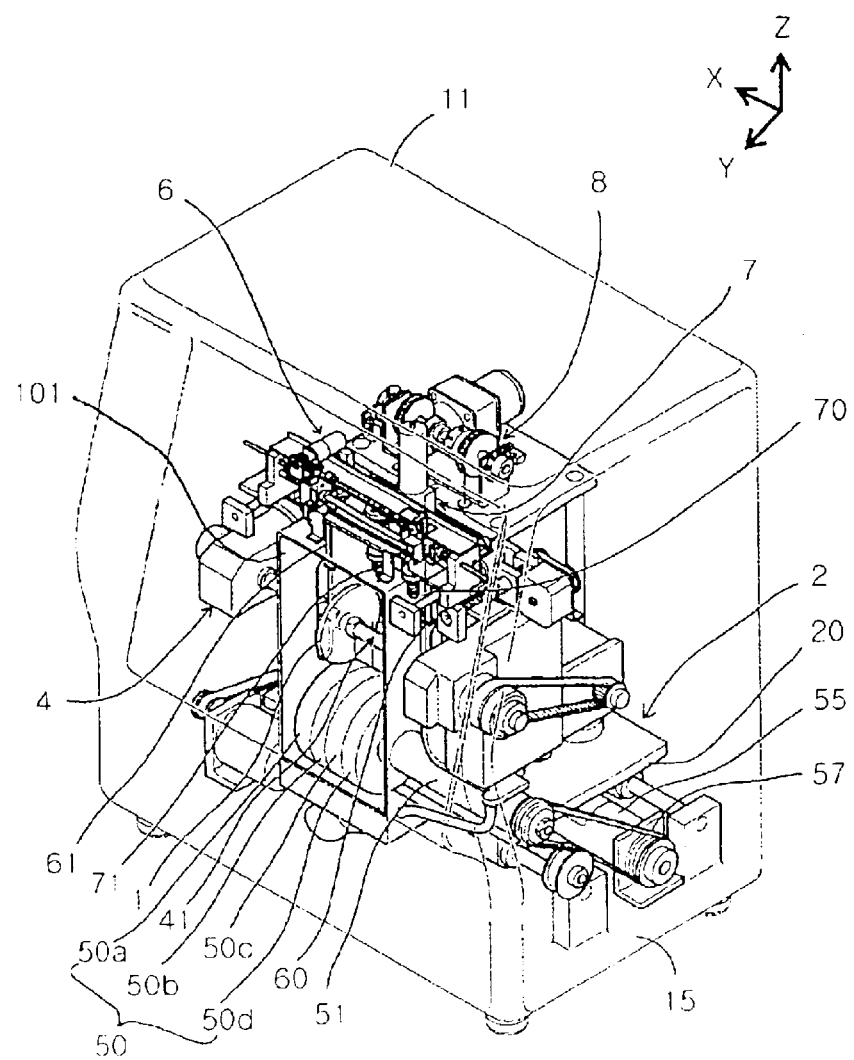
FIG. 2 shows a perspective view exhibiting the main portions of the inner construction of the apparatus of FIG. 1.

In FIG. 2, there is disposed inside of case 11, a base unit 2, which can be displaced in a direction parallel with a main shaft 51 having a main rotating tool 50 (the direction of the X-axis in the FIG. 2). The base unit 2 supports a lens unit (or lens-holding unit) 4 that can be displaced in the vertical direction (i.e., in the direction of the Z-axis in the Figs.).

The direction from the right to the left in FIG. 2 (the transverse direction of the apparatus 10 for processing a lens) is assigned to the X-axis, the vertical direction (the direction of the height of the apparatus) is assigned to the Z-axis, and the direction from the left to the right in FIG. 4 (the direction towards the inside of the apparatus) is assigned to the Y-axis. It is assumed that these axes orthogonally intersect each other.

In the lens unit 4, a lens-holding shaft 41, which is divided into two portions 41L and 41R and selectively holds the center of the lens 1 between the two portions, is disposed in a manner such that the lens-holding shaft 41 is freely rotatable. The lens-holding shaft 41 is placed on the vertical line of a rotating tool (a grinder or a cutter) 50, which is supported by a shaft on a base plate 13. The lens-holding shaft 41 and the main shaft 51 of the main rotating tool 50 are arranged parallel to each other along the X-axis. The lens 1 is held along a plane perpendicular with an axial line of the lens-holding shaft 41.

A measuring unit 6 comprising styluses 60 and 61 for measuring positions on the concave face and the convex face, respectively, of the lens 1 is fixed on the vertical line of the lens-holding shaft 41.

The styluses 60 and 61 can be displaced in a direction parallel to the lens-holding shaft 41. For the measurement of the position of the lens 1 after being completely processed, the styluses 60 and 61 are brought into contact with both faces of the lens 1 when the lens unit 4 is elevated or lowered in accordance with the data of the shape of the lens frame while the lens-holding shaft is rotated.

For processing the lens 1, starting from the condition shown in FIG. 2, the lens unit 4 is lowered after the main rotating tool 50 is rotated and the peripheral portion (the outer peripheral portion) of the lens 1 is ground into the prescribed shape by elevating or lowering the lens unit 4 in accordance with the data of the shape of the lens frame while the lens-holding shaft 41 is rotated.

By elevating or lowering the lens unit 4 based on the data of the shape of the lens frame corresponding to the rotation angle of the lens-holding shaft 41, the grinding to the processing depth in accordance with the rotation angle of the lens 1 is conducted continuously. During processing, the force of pressing the lens 1 to the main rotating tool 50 (the processing pressure) is provided by the weight of the lens unit 4 itself. The adjustment of the processing pressure in accordance with the material of the lens is conducted by supporting a portion of the weight of the lens unit 4 by a unit for controlling the processing pressure 8 disposed at a position above the lens unit 4.

The position of contact between the lens 1 and the main rotating tool 50 is changed by displacing the base unit 2 in the direction of the X-axis in the FIGS. and the selection between flat grinding and beveled grinding, for example, can be made. Switching between rough grinding and the finishing grinding can also be similarly made.

A finishing unit 7 which can be displaced in the direction of the Y-axis is disposed at a position above the lens unit 4. When the finishing unit is at the advanced position, a rotating tool for chamfering 70 and a rotating tool for grooving 71 are placed at a position directly above the lens-holding shaft 71. The selection between the rotating tools 70 and 71 is made and the position of the processing is set by elevating the lens unit 4 and driving the base unit 2 in the direction of the X-axis. The finishing is conducted in this condition.

The portions will be described in more detail in the following.

The Main Shaft Unit

In FIGS. 2, 3 and 4, the main shaft 51 in which the rotating tool (a grinder or a cutter having diamond or the like) 50 is disposed and a motor 55 for driving the main shaft 51 are fixed to the base plate 15 at the inside of the case 11. The main shaft unit 5 comprises these members as the main components.

The main shaft 51, as shown in FIG. 2, is supported by a shaft on the base plate 15 along the X-axis in a manner such that the main shaft 51 can be rotated freely and is disposed parallel with the lens-holding shaft 41.

At the end portion of the main shaft 51, a main rotating tool 50 for mechanically processing the lens 1 is attached. The main rotating tool 50 is placed at the central portion in the direction of the X-axis in FIG. 2 and at the front side of the apparatus (at the lower left side in the Figure). The base end portion of the main shaft (at the right side in the Figure) is driven by a motor 55 via a belt 57 and pulleys.

In the main rotating tool 50, which mechanically processes the lens 1, as shown in FIG. 2, a rough grinder for flat grinding 50$a$, a finishing grinder for flat grinding 50$b$, a rough grinder for beveled grinding 50$c$ and a finishing grinder for beveled grinding 50$d$ are disposed successively from the side of the tip of the main shaft 51 (the left side in the Figure). The grinding may also be conducted by using cutters as rotating tools in place of grinders.

The Base Unit

A base unit 2 for driving the lens unit 4 in the direction of the X-axis is disposed at a position inside the main shaft 51 in FIG. 2 (in the direction of the Y-axis, at the right side in the FIG.).

As shown in FIG. 3, the base unit 2 a base 20 that can be displaced in the direction of the X-axis and a servomotor 25 (hereinafter, referred to as an X-axis motor) that controls positioning of the main components by driving the base 20 in the direction of the X-axis.

The base 20 is disposed on guide members 21 and 22 that are fixed on the base plate 15 in the direction of the X-axis so that the base 20 is freely displacable. Therefore, the base 20 can be freely displaced in the direction of the X-axis.

In FIG. 3, an inner screw 23 is disposed to be freely rotatable at a position below the base 20 between the guide members 21 and 22. An outer screw 24 fixed at the lower face of the base 20 is engaged with the inner screw 23 and the base 20 is driven in the direction of the X-axis by rotation of the screw 23.

One end of the inner screw 23 and the X-axis motor 25 are connected to each other via a gear and a cogged belt 26 and the base 20 is positioned in the direction of the X-axis in accordance with the rotation angle of the X-axis motor 25.

The Elevating and Lowering Unit

As shown in FIG. 3, four poles 401 to 404 stand on the base 20. Among the four poles, the two poles 401 and 402 penetrate a frame 40 of the lens unit 4 and guide the lens unit 4 in the vertical direction (the direction of the Z-axis) in a manner such that the lens unit 4 is freely displacable.

As shown in FIGS. 3 and 4, the lens unit 4 is driven in the vertical direction and positioned in the vertical direction (i.e., in the direction of the Z-axis) by the elevating and lowering unit 3. The lens unit 4 is positioned in the direction of the X-axis by the base unit 2.

Figure 6:
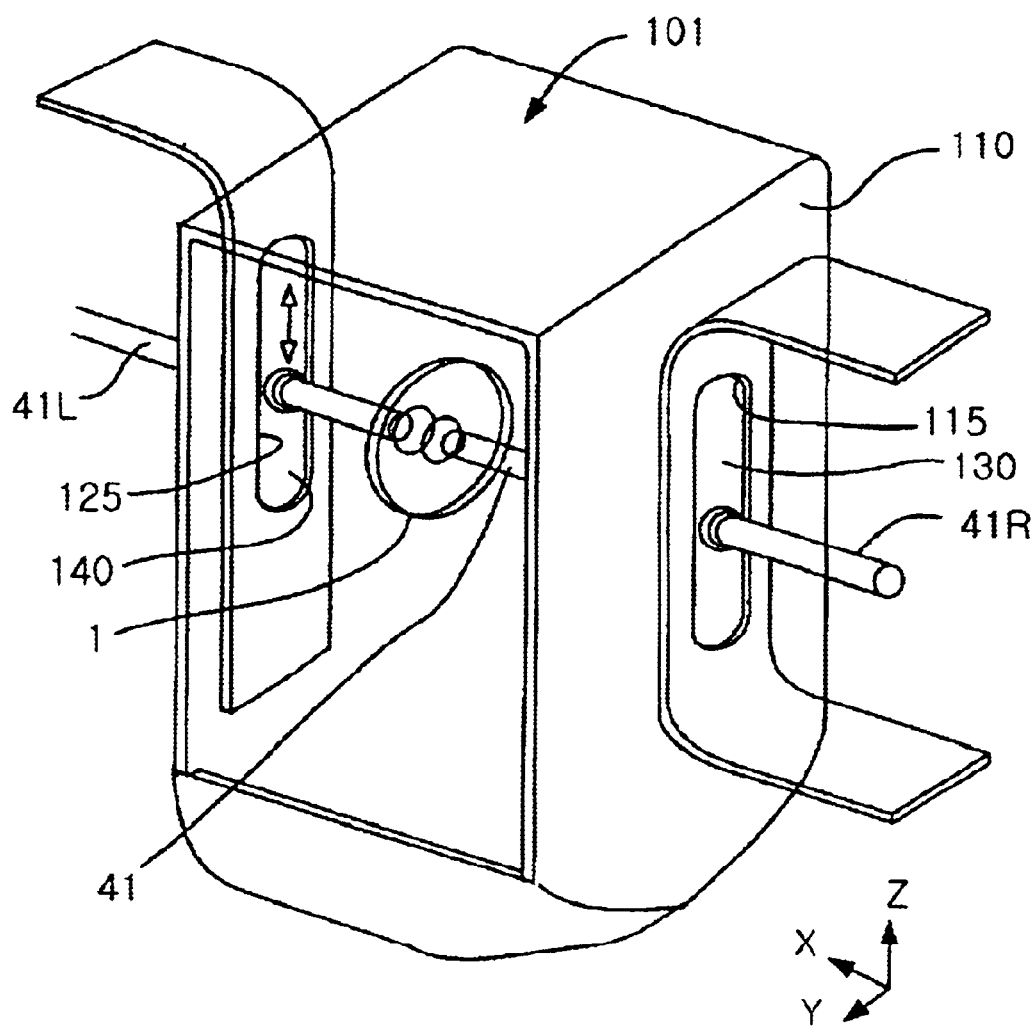
FIG. 6 shows a perspective view of the waterproof case of FIG. 5.

The elevating and lowering unit 3, as shown in FIGS. 3, 4 and 6, comprises a screw 31 that is supported by a shaft on the base 20 between the poles 401 and 402 and penetrates the frame 40 of the lens unit 4 in the vertical direction. A positioning member 34 is provided that is engaged with the screw 31 at an inner peripheral portion and can support the lens unit 4 by contacting the frame 40 of the lens unit 4 at the upper end, and a servomotor 33 is provided (hereinafter, referred to as a Z-axis motor) that is connected to the lower end of the screw 31 via a cogged belt 32 and a gear. The elevating and lowering unit 3 is disposed on the base 20.

In the elevating and lowering unit 3, the screw 31 is rotated by driving the Z-axis motor 33. Positioning member 34 having an outer screw 35 engaged with the screw 31 is driven in the direction of the Z-axis. In the positioning member 34, a stopper 36 is disposed to the side of the outer screw 35 and protrudes towards the lens unit 4. When the stopper 36 is brought into contact with the lower face of the ceiling portion 400 disposed at the frame 40 of the lens unit 4, the elevating and lowering unit supports the lens unit 4 and elevates or lowers the lens unit 4.

The outer screw 35 and the stopper 36 are fixed on a base 340 at the lower end of the positioning member 34. The stopper 36 is displaced in the direction of the Z-axis since the stopper 36 is engaged with the lens unit 4 so that rotation in the circumferential direction is restricted.

The Lens Unit

The lens unit 4 is displaced by the elevating and lowering unit 3 in the direction of the Z-axis, as shown in FIG. 3. Unit 4 is guided vertical direction (in the direction of the Z-axis) by the two poles 401 and 402 standing on the base 20. Thus, lens unit 4 can be freely displaced. Lens unit 4 comprises, as stated above, lens-holding shaft 41 which is divided into two portions, a motor 45 for driving the lens which rotates the lens-holding shaft 41, and a motor for the lens chuck 46 which changes the pressure of the lens-holding shaft 41 to hold the lens 1.

As shown in FIGS. 3 and 4, the lens-holding shaft 41 that rotatably holds lens 1 is placed at a position directly above the main rotating tool 50. The direction connecting the axial line of the lens-holding shaft 41 and the axial line of the main shaft 51 is in the vertical direction.

As shown in FIG. 3, frame 40 of the lens unit 4 comprises arms 410 and 411 protruding in the direction of the front of the apparatus (to the lower left side of FIG. 3). Frame 40 and the arms 410 and 411 form a rectangle having three sides and open to one side. The arms 410 and 411 support the lens-holding shaft 41.

The lens-holding shaft 41 is divided into two portions at the center, i.e., a shaft 41R supported by arm 410 and a shaft 41L supported by arm 411. The arm 41L is freely rotatably supported by the arm 411 at the left side in FIG. 3. The arm 41R is freely rotatably supported by the arm 410 at the right side in FIG. 3. Arm 41R is also displaceable in the axial direction (in the direction of the X-axis).

The shafts 41L and 41R are connected with the motor for driving the lens and are synchronously rotated. The shaft 41R is driven in the axial direction by the lens chuck motor and holds the lens 1 under a prescribed pressure.

As shown in FIG. 2, the main rotating tool 50 is fixed to the base plate 13 and is not displaced. The lens 1 supported by the lens unit 4 is displaced in the vertical direction relative to the main rotating tool 50 by the displacement of the elevating and lowering unit 3 in the direction of the Z-axis and the desired processing depth can be obtained.

The position of the lens 1 for the processing can be changed by changing the rotation angle of the motor for driving the lens 46 and the peripheral portion of the lens can be processed to the desired processing depth. A sensor for detecting the rotation angle of the lens-holding shaft 41 is disposed at the arm 411 of the lens unit 4.

The tool used for the processing can be changed by changing the position of contact between the lens 1 and the main rotating tool 50 by the displacement of the base 20 in the direction of the X-axis.

The Waterproof Cooling Unit

The waterproof cooling unit for supplying a cooling liquid during the processing of the lens will be described as follows. The waterproof cooling unit is used for cooling the uncut lens 1 and the tools, removes dust and debris resulting from cutting and processing and prevents scattering of the cooling water to the mechanisms of the apparatus outside the processing area. In the present embodiment, a cooling liquid comprising water as the main component is used.

Figure 5:
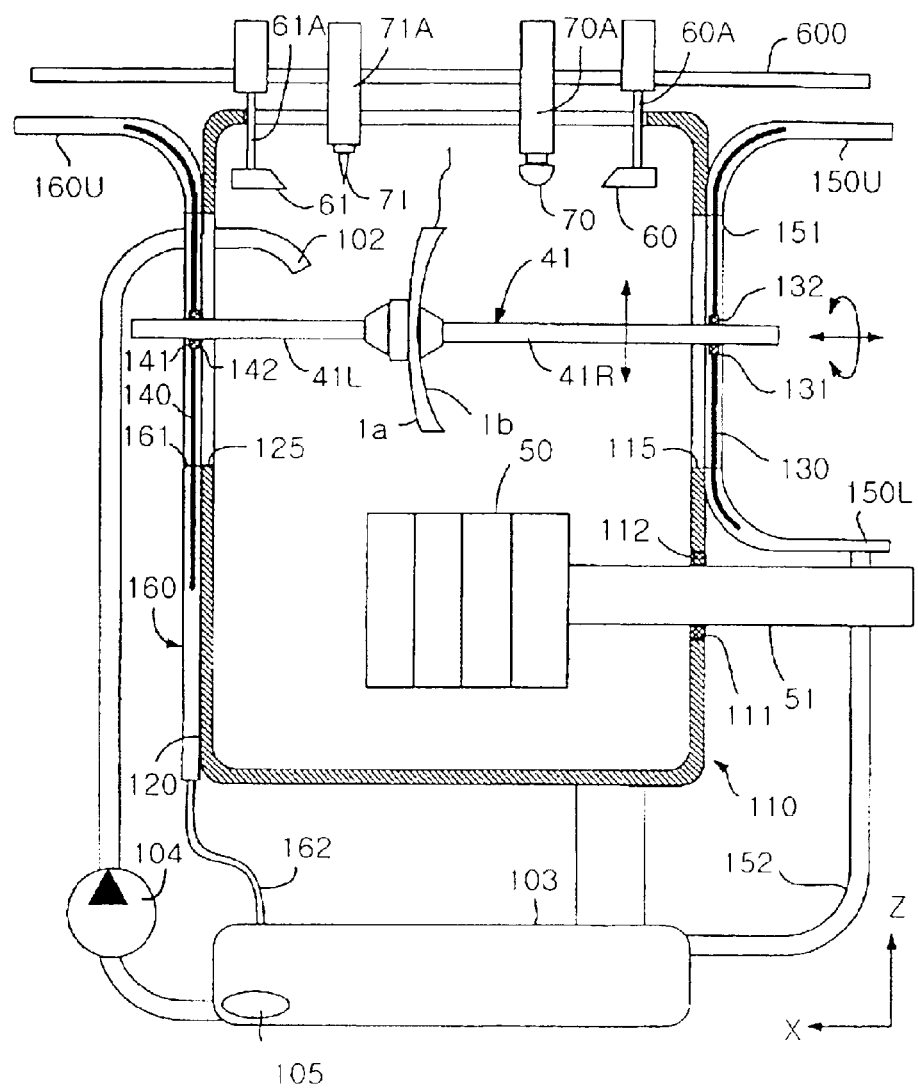
FIG. 5 shows a sectional view of the main portions of a waterproof case in a waterproof cooling mechanism according to an embodiment of the present invention.

As shown in FIG. 5, the waterproof cooling unit comprises:
    a waterproof case 101 that has the shape of a box and is fixed to a processing area surrounding the main rotating tool 50; lens 1 supported by the lens-holding shaft 41; styluses 60 and 61 of the measuring unit 6; rotating tools 70 and 71 of the finishing unit 7; a nozzle 102 for injecting the cooling liquid into the vicinity of the lens 1 held by the lens-holding shaft 41; a tank 103 disposed at a position below the waterproof case 101; and a pump 104 for dispensing the cooling liquid in the tank 103 to the nozzle 102 under pressure. The waterproof case 101 and the tank 103 are fixed on the base plate 13 in FIG. 2.

The nozzle 102 is supported by the lens unit 4 and can always inject cooling water towards the lens 1 independently of the position of the elevating and lowering unit 4.

Although the front of the waterproof case 101 (at the left side in FIG. 2) is open, the door 14 can be opened and closed as shown in FIG. 1. When the door 14 is opened, the lens is attached or detached. When the door 14 is closed, the inside of the waterproof case 101 is tightly closed and wetting of the bearing of the main shaft 51, the motors, the power source and the electric circuits with the scattered cooling liquid injected in the waterproof case 101 is prevented.

The cooling liquid used for cooling the lens 1 and the rotating tools during the processing returns to the tank 103, is sucked into the pump 104 and circulated. Since the cooling liquid used for cooling the lens 1 contains dust and debris formed by processing the lens 1, a drain 105, which can be opened and closed, is attached to the tank 103 so that the dust and debris formed by cutting can be removed and the cooling liquid can be exchanged with the fresh cooling liquid.

As shown in FIGS. 2 and 5, the main shaft 51 is supported by the base plate 13 at one end portion thereof The main rotating tool 50 disposed at the free end portion of the main shaft 51 is placed in the waterproof case 101 and the main shaft 51 is inserted through a penetrating hole 111 disposed at the side face 110 of the waterproof case 101 shown at the right side in FIG. 5. A sealing member 112 is placed between the penetrating hole 111 and the main shaft 51.

Since the lens-holding shaft 41 is elevated and lowered along the vertical line of the main shaft 51, as shown in FIGS. 5 and 6, long holes 115 and 125 penetrate the waterproof case 110 in the direction of the X-axis in the prescribed range in the vertical direction, and are formed at the side faces 110 and 120 of the waterproof case 101, and are placed on the vertical line of the main shaft 51. The lens-holding shaft 41 is elevated and lowered while the lens-holding shaft 41 is inserted into the long holes 115 and 125 and the lens 1 is held at the center of the case 101.

At the outside of the waterproof case 101 having the long holes 115 and 125, sliding shutters 130 and 140, which are elevated and lowered in combination with the lens-holding shaft 41, are attached to the left side and to the right side, respectively, of the lens-holding shaft 41. The sliding shutters 130 and 140 comprise a plate-shaped, flexible and elastic water-resistant member. For example, the sliding shutters may be formed from a resin material such as polyurethane.

The areas of displacement of both end portions of the sliding shutter 130 protrude from the upper portion and the lower portion of the waterproof case 101 on the extension of the locus of displacement of the lens-holding shaft 41 (in the vertical direction in FIG. 5).

In FIGS. 5 and 6, the shaft 41R holding the concave face 1b of the lens 1 is inserted through a penetrating hole 131 of the sliding shutter 130. A sealing member 132 is placed between the penetrating hole 131 and the shaft 41L. The shaft 41R can be displaced through the sliding shutter 130 in the axial direction, can be rotated freely and is displaced in combination with the sliding shutter 130 in the vertical direction.

The plate-shaped sliding shutter 130 is displaced inside a guide member 150 which is bent and formed into a shape of a rectangle having three sides and being open at one side. The sliding shutter 130 is displaced along the longitudinal direction of the guide member 150. The guide member 150 has a hollow rectangular sectional shape so that the sliding shutter 130 can be guided with sliding.

Since a shaft 600 guiding the stylus 60 of the measuring unit 6 is fixed at the upper portion (the upper end portion) 150U of the guide member 150, the upper portion 150U of the guide member 150 is bent at a position before the shaft 600 in the horizontal direction (in the axial direction of the lens-holding shaft) towards the outside of the apparatus (to the right side in FIG. 5), so that interference with the mechanisms at the upper portions of the apparatus can be prevented.

Since the main shaft 51 is placed directly below the long holes 115 and 151, the lower portion (the lower end portion) 150L of the guide member 150 is bent at a portion between the long hole 151 and the main shaft 51 in the horizontal direction (in the axial direction of the lens-holding shaft) towards the outside of the apparatus (to the right side in FIG. 5) in a manner similar to the upper portion 150U so that the interference with the main shaft 51 can be prevented. The lower portion 150L is extended along the main shaft 51 approximately in the horizontal direction (in the direction of the X-axis).

The middle portion of the guide member 150 contacts the side 110 and is formed in a shape of a straight line. At the portion facing the long hole 115 of the side 110, the long hole 151 having a shape the same as the shape of the long hole 115 is formed and penetrates the guide member 150. At the inner periphery of the long hole 151, the inner periphery of the waterproof case 101 is tightly closed with the sliding shutter 130.

The shaft 41L holding the convex face la of the lens 1 is inserted through a penetrating hole 141 of the sliding shutter 140. A sealing member 142 is placed between the penetrating hole 141 and the shaft 41L. The shaft 41L can be displaced through the sliding shutter 140 in the axial direction, can be rotated freely and is displaced in combination with the sliding shutter 140 in the vertical direction.

The sliding shutter 140 having the plate shape is disposed inside a guide member 160 that has the shape of an inverse L and displaced along the longitudinal direction of the guide member 160. The guide member 160 has a hollow rectangular sectional shape so that the sliding shutter 140 can be guided with sliding.

Since a shaft 600 guiding the stylus 61 of the measuring unit 6 is fixed at the upper portion (the upper end portion) 160U of the guide member 160, the upper portion 160U of the guide member 160 is bent in the horizontal direction towards the outside of the apparatus (to the left side in FIG. 5) so that the interference with the mechanisms at the upper portions of the apparatus can be prevented.

The middle portion to the lower end portion of the guide member 160 contacts the side 120 and is formed in the shape of a straight line. At the portion facing the long hole 125 of the side 120, the long hole 161 having a shape the same as the shape of the long hole 125 is formed and penetrates the guide member 160. At the inner periphery of the long hole 161, the inner periphery of the waterproof case 101 is tightly closed with the sliding shutter 140.

In FIG. 5, the guide member 160 is formed in the shape of a straight line since the main shaft 51 is supported at one end at the right side in the Figure and no mechanisms or members interfering with the sliding shutter 140 and the guide member 160 are present below the side face 120 of the waterproof case 101 at the left side in the Figure.

The sliding shutters 130 and 140 which can be displaced in the vertical direction in combination with the lens-holding shaft 41, slide at the inside of the guide members 150 and 160, respectively. Guide members 150,160 are formed in a bent shape so that interference with the mechanisms above or below the sliding shutters is prevented. The cooling liquid, which is prevented from scattering to the outside due to the sliding shutters 130 and 140 which are exposed to the inside of the waterproof case 101 at the long holes 151 and 161, respectively, accumulates at a lower portion of the guide members 150 and 160. Therefore, drain pipes 152 and 162 which are each connected with a tank 103 are connected with the lower portions of the guide members 150 and 160, respectively.

Figure 7:
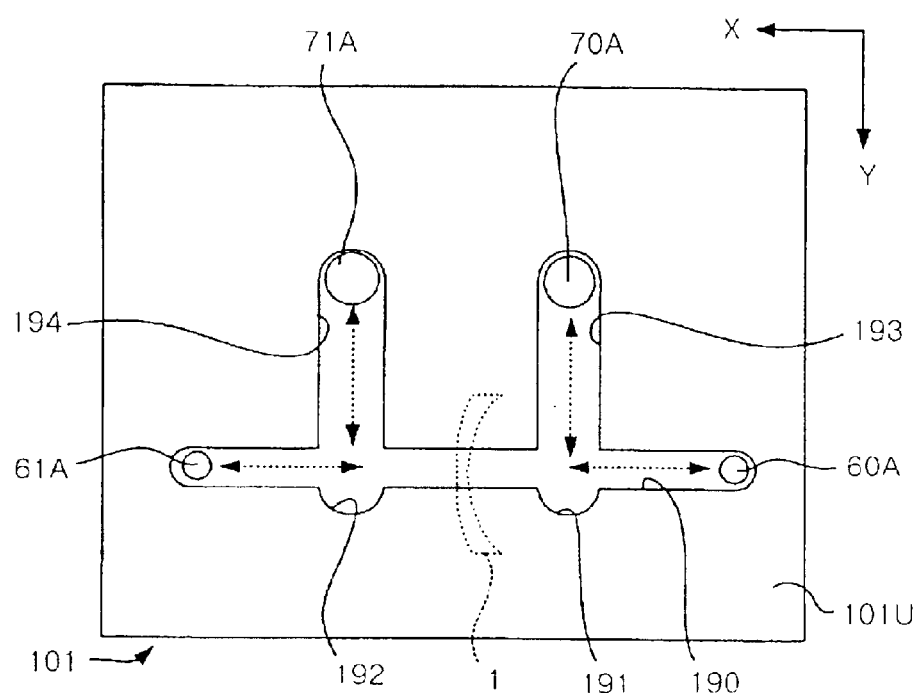
FIG. 7 shows a plan view exhibiting the upper face of the waterproof case of FIG. 5.

On the upper face 101U of the waterproof case 101, as shown in FIG. 7, a penetrating hole 190 (a first penetrating hole) having the shape of a long hole through which shafts 60A and 61A of the styluses 60 and 61, respectively, of the measuring unit displaced in the direction of the X-axis are inserted is formed at a position directly above the lens-holding shaft 41. Penetrating holes 193 and 194 (second penetrating holes) are also formed, through which sleeves 70A and 71A, respectively, containing shafts of the rotating tools 70 and 71, respectively, of the finishing unit 7 displaced in the direction of the Y-axis during the chamfering or the grooving are inserted. The penetrating hole 190 intersects the penetrating holes 193 and 194 and these holes form a continuous single opening.

Since the rotating tools 70 and 71 are displaced to the position vertically above the lens-holding shaft 41, concave portions 191 and 192 having a circular shape and engaged with portions of the 70A and 71A, respectively, are formed in the penetrating hole 190 and penetrate the upper face 101U.

To prevent the cooling water injected inside of the waterproof case 101 from scattering to the outside through the penetrating holes 190 to 197 formed on the upper face 101U, an upper waterproof unit is provided that prevents the scattering of water in accordance with the displacement of the measuring unit 6 and the finishing unit 7.

Figure 8:
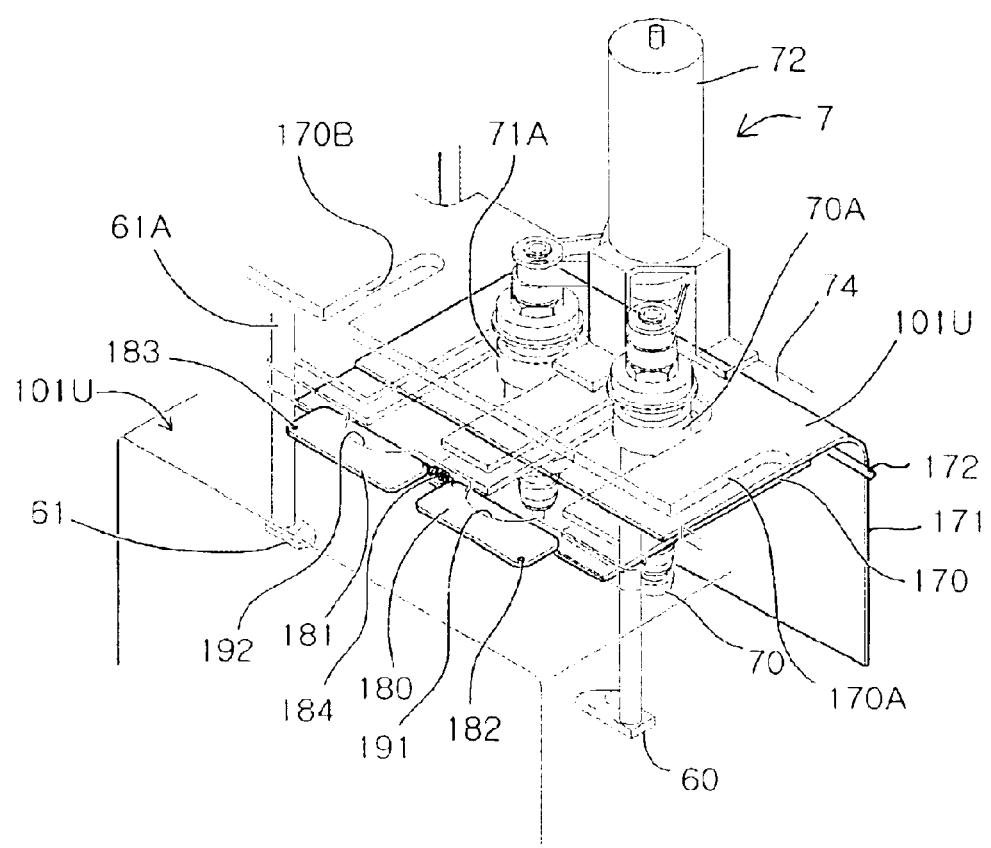
FIG. 8 shows a perspective view of an upper portion of the waterproof case shown above, exhibiting the positions of waterproof members for sealing the finishing unit from water.
Figure 9:
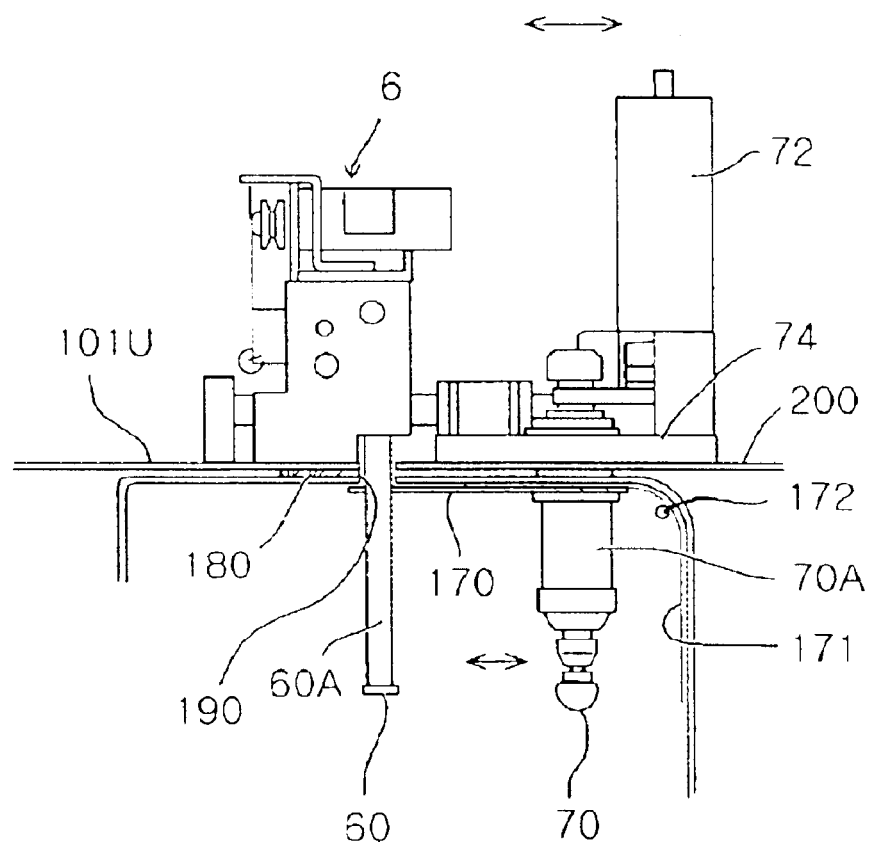
FIG. 9 shows a sectional view of an upper portion of the waterproof case shown above, exhibiting the positions of sealing the finishing unit from water.

At a position above the upper face 101U of the waterproof case 101, as shown in FIGS. 8 and 9, a frame 200 is fixed in the horizontal direction. The measuring unit 6 is fixed at the frame 200 and shafts 60A and 61A of the styluses 60 and 61, respectively, are disposed downwards.

In the finishing unit 7, the sleeves 70A and 71A of the rotating tools 70 and 71, respectively, are disposed on the base 74 which can be displaced in the direction of the Y-axis on the frame 200. A motor 72 connected with the sleeves via belts stands on the base 74. The base 74 is displaced in the direction of the Y-axis (in the direction perpendicularly intersecting the lens-holding shaft 41) and drives the rotating tools 70 and 71. The base 74 is advanced or retracted between the prescribed position for processing (the position where the axial lines of the rotating tools 70 and 71 are placed at positions vertically above the lens-holding shaft) and the prescribed waiting position (the position where the axial lines of the rotating tool 70 and 71 are separated from the positions vertically above the lens holding-shaft by the prescribed distance in the direction of the Y-axis) by a motor not shown in the Figure. When the lens 1 is processed by the rotating tool 50 of the main shaft 51, the base 74 is advanced to the prescribed waterproof position.

Figure 10:
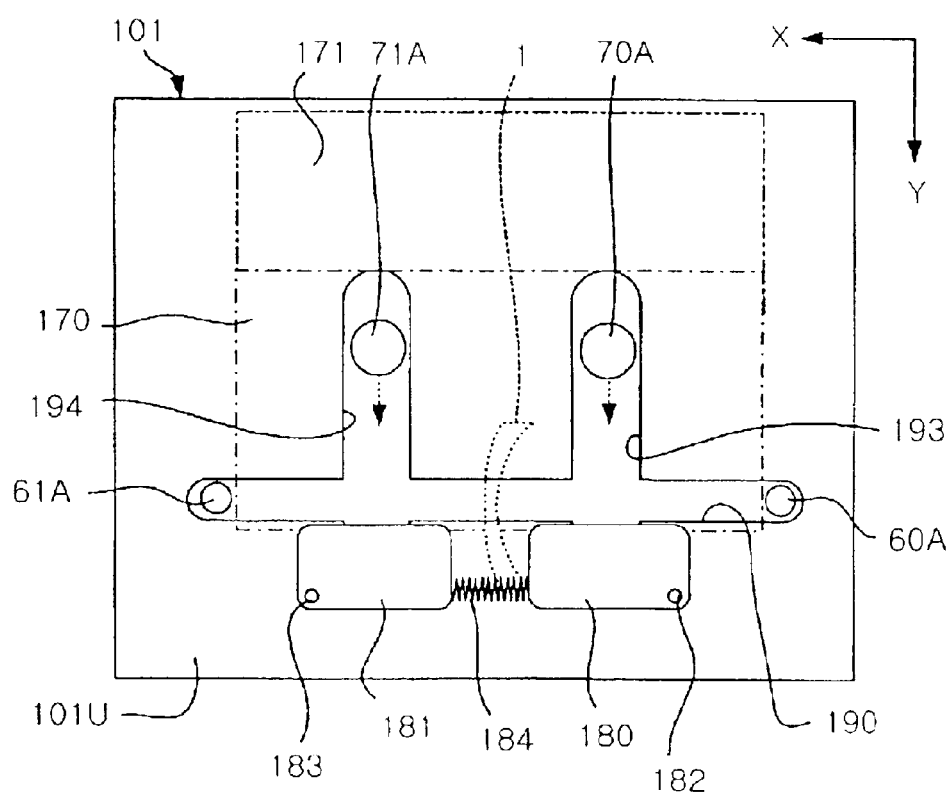
FIG. 10 shows a plan view of an upper portion of the waterproof case, exhibiting the positions of the water seals of the finishing unit.

As shown in FIGS. 8 to 10, the sleeves 70A and 71A protrude at the inside of the waterproof case 101 and a shutter having a plate shape 170 is fixed to the sleeves 70A and 71A towards the styluses 60 and 61.

As shown in FIG. 10, the shutter 170 has a size such that, when the styluses are placed at the waiting positions and the base 74 is placed at the position advanced by the prescribed distance (at the waterproof position), the penetrating hole 190 between the shafts 60A and 61A and the penetrating holes 193 and 194 through which the sleeves 70A and 71A, respectively, are inserted are all closed.

A shutter 171 having the shape of a flexible plate or cloth is disposed at the sleeves 70A and 71A and extends towards the inside of the apparatus (towards the right side in FIG. 9).

Figure 11:
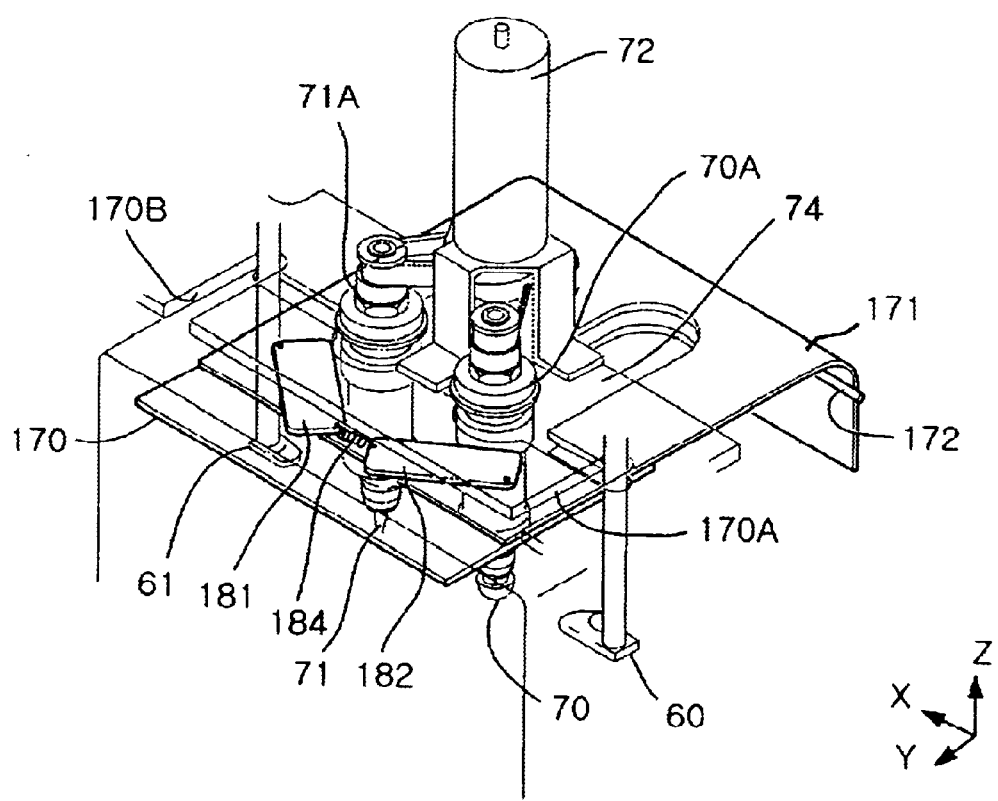
FIG. 11 shows a perspective view of an upper portion of the waterproof case, exhibiting the positions when the finishing unit is in the processing position.
Figure 12:
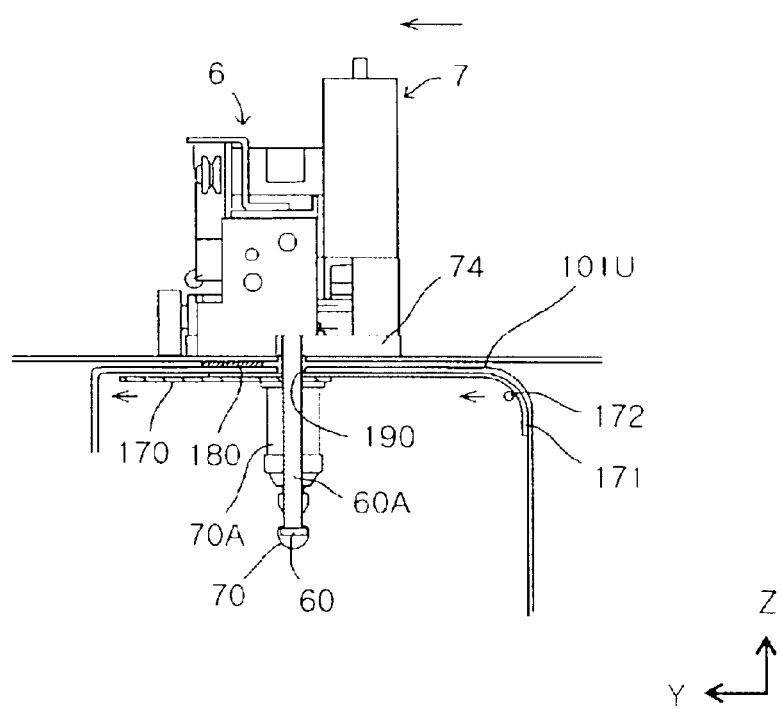
FIG. 12 shows a sectional view of an upper portion of the waterproof case, exhibiting the positions when the finishing unit is in the processing position.
Figure 13:
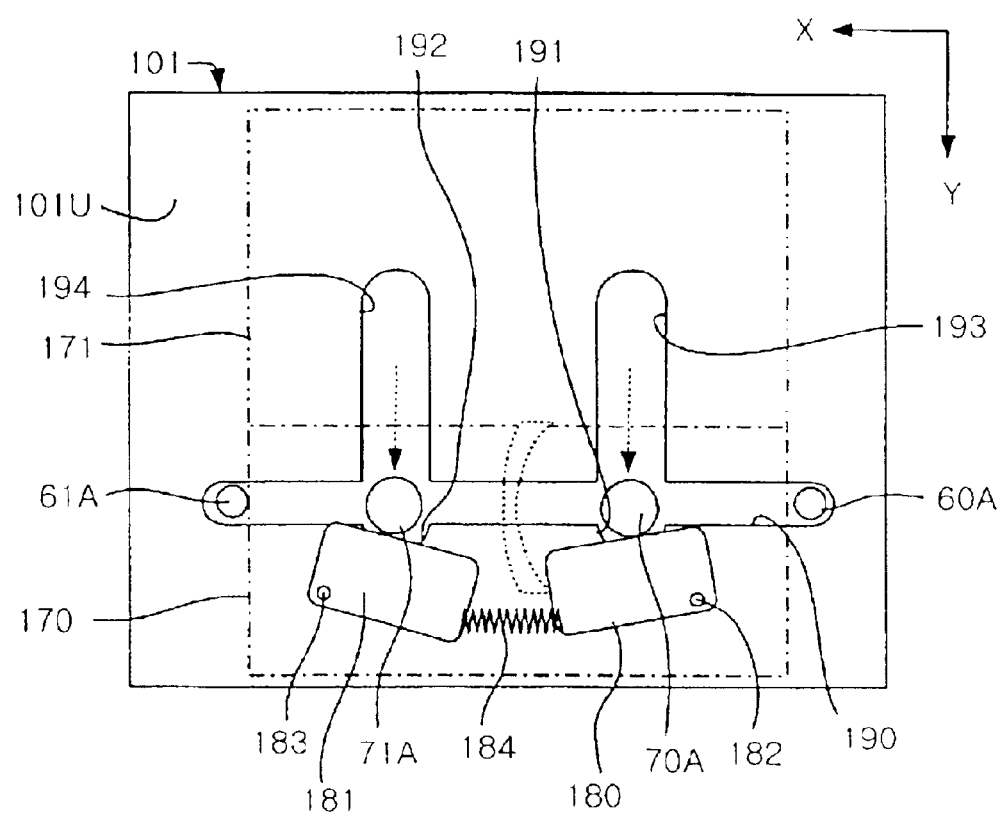
FIG. 13 shows a plan view of an upper portion of the waterproof case, exhibiting the positions when the finishing unit is in the processing position.

As shown in FIGS. 11 to 13, the shutter 171 closes the penetrating holes 193 and 194 placed at the positions inside the sleeves 70A and 71A, respectively, when the base 74 is displaced to the prescribed finishing position (where the rotating tools are placed at positions vertically above the lens-holding shaft 41). Since the shutter 171 is flexible, as shown in FIGS. 8 and 9, the shutter 171 can be displaced along the penetrating holes 193 and 194 in accordance with the advancement and the retirement of the base 74 and can close the penetrating holes 194 and 194. Dangling of the shutter 171 towards the lens 1 is prevented by a guide shaft 172 disposed in the direction of the X-axis at a position further inside the waterproof case 101.

On the upper face 101U having the concave portions 191 and 192, swinging shutters 180 and 181 are provided which are swung in the horizontal direction around the shafts 182 and 183, respectively, and selectively close the concave portions 191 and 192, respectively. The swinging shutters 180 and 181 are connected to each other by a return spring 184 at each portion at the front side of the apparatus (at the lower side in FIG. 10 and at the left side in FIG. 9). When the sleeves 70A and 71A do not contact the swinging shutters 180 and 181, respectively, as shown in FIGS. 8 to 10, the swinging shutters 180 and 181 are pushed towards the positions closing the concave portions 191 and 192. On the upper face 101U, stoppers (not shown in the Figures) for arresting the swinging shutters 180 and 181 are disposed and the swinging shutters 180 and 181 are kept at the positions closing the concave portions 191 and 192, respectively.

The working of the shutters will be described as follows.

Figure 14:
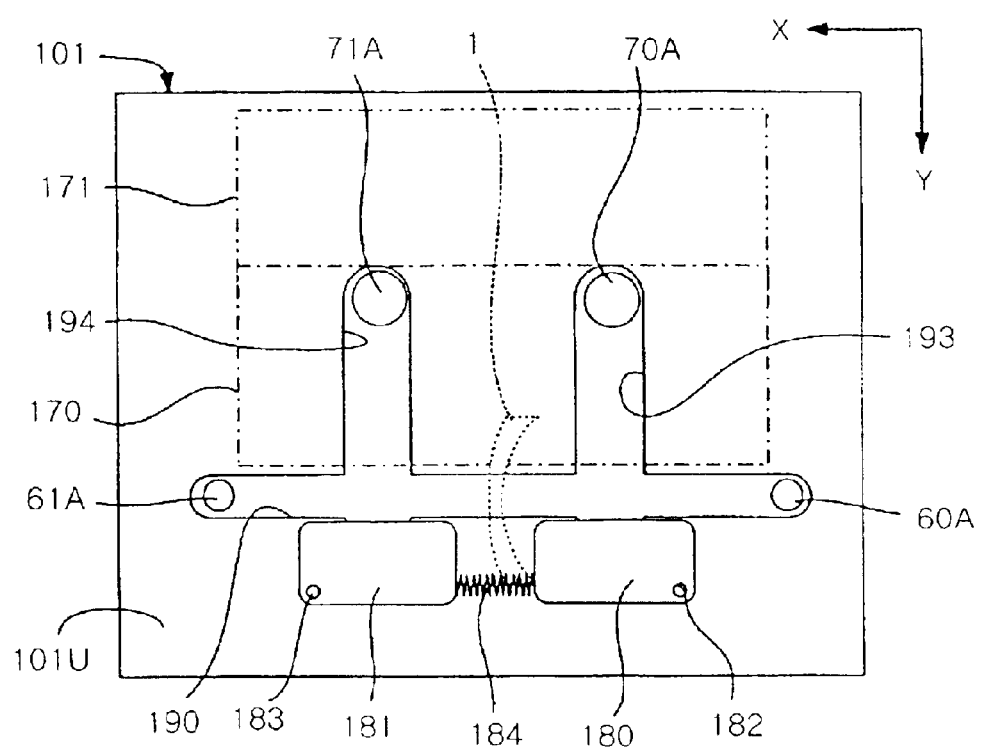
FIG. 14 shows a plan view of an upper portion of the waterproof case, exhibiting the positions when the finishing unit is in the waiting position.

When the processing is not conducted, as shown in FIG. 14, the finishing unit 7 is placed at the waiting position at the upper side in the Figure and the sleeves 70A and 71A are placed at the end portion of the penetrating holes 193 and 194 having the shape of a long hole, respectively. The shutter having the plate shape 170 protruding from the sleeve 70A and 71A towards the styluses (towards the front of the apparatus) leaves the penetrating hole 190 open and the displacement of the styluses 60 and 61 in the direction of the X-axis is allowed.

When the processing of the lens 1 is conducted by the rotating tool 50 of the main shaft 51, as shown in FIGS. 8 to 10, the base 74 is advanced by the prescribed distance to the position where the tip of the shutter 170 (the end portion at the side of the penetrating hole 190) is placed beyond the penetrating hole 190 and the penetrating hole 190 is completely closed (i.e., displacement towards the position at the front of the apparatus or the position vertically above the lens-holding shaft 41).

At this position (the waterproof position), due to the advancement of the base 74, the penetrating holes 190 between the shafts 60A and 61A of the styluses 60 and 16, respectively, and the penetrating holes 193 and 194 through which the sleeves 70A and 71A, respectively, are inserted are closed by the shutter 170 and the concave portions 191 and 192 are closed by the swinging shutters 180 and 181, respectively. Therefore, scattering of the cooling liquid injected towards the lens 1 to the outside of the apparatus is prevented by the shutters 170, 180 and 181.

When chamfering or the grooving is conducted, as shown in FIGS. 11 to 13, the rotating tools 70 and 71 are advanced to positions for finishing where the rotating tools face lens 1 on the vertical line of the lens-holding shaft.

At this time, a portion of the sleeves 70A and 71A closes the concave portions 191 and 192, respectively, and the sleeves 70A and 71A rotates the shutters 180 and 181, respectively, by pushing the shutters.

In the direction of the X-axis from the sleeves 70A and 71A, the advanced shutter 170 closes the penetrating hole 190. The penetrating holes 193 and 194 at the positions further inside the apparatus from the sleeves 70A and 71A (at the upper side in FIG. 13 and at the right side in FIG. 12) are closed by the shutter 171 which is pulled and displaced by the sleeves 70A and 71A.

At this position of finishing, due to the advancement of the base 74, the concave portions 191 and 192 are closed by the sleeves 70A and 71A, respectively, and the penetrating hole 190 is closed by the shutter 170. At positions further inside the apparatus (e.g., at the side of the waiting position), from the sleeves 70A and 71A, the penetrating holes 193 and 194 are closed by the shutter 171. Therefore, the scattering of the cooling liquid injected towards the lens 1 toward the outside of the apparatus is prevented by the shutters 170 and 171.

When finishing is completed and the finishing unit is displaced to the waiting position shown in FIG. 14, the swinging shutters 180 and 181 are swung to the prescribed positions by being pulled by the spring 184 (the elastic member) and closes the concave portions 191 and 192. The shutter 170 is displaced to the position at the inside of the apparatus and the penetrating hole 190 is opened. The styluses 60 and 61 can be displaced in the direction of the X-axis in this condition.

Workings of the Apparatus in Accordance with the Present Invention

As described above, the penetrating hole 111 through which the main shaft 51 supported on the base plate 13 is inserted and the long holes 115 and 125 through which the lens-holding shaft 41 freely displaced in the vertical direction is inserted are formed on the waterproof case 101 covering the area of processing the lens 1 in a manner such that the holes penetrate the waterproof case 101. The penetrating hole 111 and the main shaft 51 are sealed from water by the sealing member 112. The right and left long holes 115 and 125 are sealed from water by the sliding shutters 130 and 140, respectively, which are each connected to the lens-holding shaft 41 in the form extending in the direction of the displacement of the lens-holding shaft 41 (in the direction along the range of displacement). Scattering of the cooling liquid toward the outside of the waterproof case 101 is thus prevented.

Since the lens-holding shaft 41 is displaced towards the main shaft 51, when the lens-holding shaft 41 is lowered in FIG. 5, the sliding shutter 130 is displaced towards the main shaft 51. The guide member 150 guiding the sliding shutter 130 has a long hole 151 having the same shape as that of the long hole 115, and is formed at the same position as that of the long hole 115. Since the lower portion 150L of the guide member 150 below the long hole 151 is bent to the right side in the Figure along the main shaft 51, the lower end portion of the sliding shutter 130 is guided by the bent portion of the guide member 150 and contained in the lower portion 150L which extends along and above the main shaft 51. Although the direction of the sliding shutter 130 is the vertical direction along the side face 110 of the waterproof case 101 at portions faced to the long hole 151, the direction is changed to the horizontal direction by the bent guide member 150 at the portion below the long hole 151.

Since the sliding shutter 130 is formed in a plate shape from a freely flexible water-resistant material and can slide along the inner peripheral portion of the guide member 150, the interference of the main shaft 51 and the sliding shutter 130 can be prevented while the penetrating hole (the long hole 151) of the waterproof case 101 through which the lens-holding shaft displaced towards the main shaft 51 is inserted is surely sealed from water even when mechanisms such as the main shaft 51 of the main rotating tool 50 are present on the extension of the direction of displacement of the lens-holding shaft.

Since the finishing unit 7 and the measuring unit 6 are present at the upper portion of the waterproof case 101, sliding shutters 130 and 140 would interfere with these mechanisms when the sliding shutters 130 and 140 were placed on the extension of the range of displacement of the lens-holding shaft 41. However, since the upper portions 150U and 160U of the guide members 150 and 160, respectively, which guide the sliding shutters 130 and 140, respectively, are bent in a manner similar to that in the vicinity of the main shaft 51, the directions of displacement of the sliding shutters 130 and 140 sliding at the inside are changed from the vertical direction at the positions of the long holes 151 and 162, respectively, to the horizontal direction. Due to this change, the interference of the sliding shutters 130 and 140 with the mechanisms and the members other than the main shaft 51 can be prevented and the freedom of design of the waterproof mechanism in the use of the cooling liquid can be increased.

In particular, when the cooling apparatus is disposed after arrangements of various mechanisms have been decided, the present invention is remarkably effective. The guide members of the sliding shutters can be disposed utilizing spaces such as spaces at the sides of the waterproof case. The relation between the main shaft 51 of the main rotating tool 50 and the lens-holding shaft 41 can be designed more freely than that in conventional cases. Therefore, an apparatus exhibiting an excellent balance between waterproofness and processing ease can be provided.

In the present embodiment, since the waterproof case 101 covers only the area of processing containing the main rotating tool 50, the lens 1, the lens-holding shaft 41, the styluses 60 and 61 of the measuring unit 6 and the rotating tools 70 and 71 of the processing unit 7, the area of exposure of the mechanisms such as the main shaft 51 and the lens unit 4 to the cooling liquid is kept at a minimum and the durability of the apparatus can be increased.

In the above embodiment, the lens-holding shaft is displaced in the vertical direction towards the main shaft 51. However, the present invention is not limited to this embodiment. When the lens-holding shaft is displaced in the horizontal direction or the lens-holding shaft is swung towards the main shaft 51 in a conventional manner, the waterproof mechanism can be surely provided by using a bent guide member containing a flexible water-resistant sliding shutter at the inside and connecting the guide member with the lens-holding shaft 41 even when the main shaft 51 is present on the extension of the locus of the displacement of the lens-holding shaft 41.

The present invention can be applied to the case in which a sliding shutter for closing openings along the lens-holding shaft from water interferes not only with the main shaft but also with other mechanisms and members.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

What is claimed is:

1. An apparatus for processing a lens, comprising:
   a waterproof case;
   a lens-holding shaft arranged to hold a lens and penetrate the waterproof case, and disposed at least partially in the waterproof case;
   a processing device disposed to processes a peripheral portion of the lens, wherein the lens-holding shaft is displacable towards the processing device;
   a cooling liquid dispenser disposed to inject cooling liquid towards the lens;
      wherein a long hole is formed along a locus of displacement of the lens-holding shaft at a portion of the waterproof case where the lens-holding shaft penetrates the waterproof case;
   a flexible sliding shutter connected to the lens-holding shaft and disposed to close the long hole; and
   a guide member disposed outside of the long hole to guide the sliding shutter, wherein the guide member is bent in an axial direction of the lens-holding shaft.

2. An apparatus according to claim 1, wherein the processing device comprises a main shaft parallel with the lens-holding shaft, and wherein the guide member is bent at a position between the long hole and the main shaft.

3. An apparatus according to claim 2, further comprising a drain arranged to discharge cooling liquid accumulated at a lower portion, or at an inside of the guide member.

4. An apparatus according to claim 3, wherein the waterproof case stands in a vertical direction, the lens-holding shaft is displaced in a vertical direction above the main shaft, and the guide member is disposed in a vertical direction at a position facing the long hole and is bent above the main shaft towards an outside of the apparatus.

5. An apparatus according to claim 2, wherein the waterproof case stands in a vertical direction, the lens-holding shaft is displaced in a vertical direction above the main shaft, and the guide member is disposed in a vertical direction at a position facing the long hole and is bent above the main shaft towards an outside of the apparatus.

6. An apparatus according to claim 1, further comprising a drain arranged to discharge cooling liquid accumulated at a lower portion, or at an inside of the guide member.

7. An apparatus according to claim 6, wherein the waterproof case stands in a vertical direction, the lens-holding shaft is displaced in a vertical direction above the main shaft, and the guide member is disposed in a vertical direction at a position facing the long hole and is bent above the main shaft towards an outside of the apparatus.

8. An apparatus for processing a lens according to claim 1, further comprising:
   a finishing device disposable to chamfer or groove a peripheral portion of the lens;
   a measurement device disposed to measure a peripheral shape of the lens, and process a peripheral portion of the lens, wherein the lens-holding shaft is displacable toward the finishing device;

wherein the lens-holding shaft is elevatable and lowerable in a vertical direction;

wherein the measurement device is fixed on an upper face of the waterproof case and supports a pair of measuring devices protruding towards an inside of the waterproof case in a manner such that the measuring device can be displaced along the lens-holding shaft;

wherein the finishing device is disposed on the upper face of the waterproof case and supports rotating tools for processing a peripheral portion of the lens, wherein the rotating tools are displacable between a position vertically above the holding shaft and a prescribed waiting position in a direction intersecting the holding shaft;

a first penetrating hole having a shape of a long hole is formed on the upper face of the waterproof case in accordance with a range of displacement of the measuring device along the holding shaft;

a second penetrating hole formed on the upper face of the waterproof case in accordance with a range of displacement of the rotating tools in a direction intersecting the holding shaft; and one or more shutters, disposed at a side of the rotating tool, and arranged to close the first penetrating hole and the second penetrating holes at an inner periphery of the waterproof case.

9. An apparatus for processing a lens, comprising:

a waterproof case;

a lens-holding shaft arranged to hold a lens;

a finishing device disposable to chamfer or groove a peripheral portion of the lens;

a measurement device disposed to measure a peripheral shape of the lens, and process a peripheral portion of the lens, wherein the lens-holding shaft is displacable toward the finishing device;

a cooling liquid dispenser disposed to inject cooling liquid towards the lens;

wherein the lens-holding shaft is elevatable and lowerable in a vertical direction;

wherein the measurement device is fixed on an upper face of the waterproof case and supports a pair of measuring devices protruding towards an inside of the waterproof case in a manner such that the measuring device can be displaced along the lens-holding shaft;

wherein the finishing device is disposed on the upper face of the waterproof case and supports rotating tools for processing a peripheral portion of the lens, wherein the rotating tools are displacable between a position vertically above the holding shaft and a prescribed waiting position in a direction intersecting the holding shaft;

a first penetrating hole having a shape of a long hole formed on the upper face of the waterproof case in accordance with a range of displacement of the measuring device along the holding shaft;

a second penetrating hole formed on the upper face of the waterproof case in accordance with a range of displacement of the rotating tools in a direction intersecting the holding shaft; and one or more shutters, disposed at a side of the rotating tool, and arranged to close the first penetrating hole and the second penetrating holes at an inner periphery of the waterproof case.

10. An apparatus according to claim 9, wherein the finishing device further comprises
 a base disposed on an upper face of the waterproof case and displaced towards the holding shaft,
 one or more sleeves fixed at the base and protruding into an inside of the waterproof case and
 rotating tools disposed at lower ends of the sleeves; and wherein the shutters further comprise
 a first shutter disposed at the sleeves towards the first penetrating hole in a horizontal direction along the inside of the waterproof case, and
 a second shutter disposed at the sleeves at a side opposite to a side of the first penetrating hole.

11. An apparatus according to claim 10, further comprising:

concave portions engagable with portions of the sleeves and formed at a position intersecting the second penetrating holes in the first penetrating hole and penetrate the first penetrating hole, and swinging shutters arranged to selectively close the concave portions in accordance with displacement of the sleeves, and disposed at an upper face of the waterproof case.

* * * * *